United States Patent
Main

(10) Patent No.: US 9,978,539 B1
(45) Date of Patent: May 22, 2018

(54) EXTRACTOR OF A BUSHING CONDUCTOR FROM A BUSHING INSULATOR FOR A DEAD TANK CIRCUIT BREAKER

(71) Applicant: General Electric Technology GmbH, Baden (CH)

(72) Inventor: James E. Main, West Alexander, PA (US)

(73) Assignee: General Electric Technology GmbH, Baden (CH)

( * ) Notice: Subject to any disclaimer, the term of this patent is extended or adjusted under 35 U.S.C. 154(b) by 0 days. days.

(21) Appl. No.: 15/427,555

(22) Filed: Feb. 8, 2017

(51) Int. Cl.
*H01H 9/08* (2006.01)
*H01H 33/53* (2006.01)

(52) U.S. Cl.
CPC .............. *H01H 9/08* (2013.01); *H01H 33/53* (2013.01)

(58) Field of Classification Search
CPC .. H01H 33/666; H01H 33/022; H01H 71/322; H01H 77/10
See application file for complete search history.

(56) References Cited

U.S. PATENT DOCUMENTS

| | | | | |
|---|---|---|---|---|
| 3,903,387 A | * | 9/1975 | Sasaki | H01H 33/02 218/45 |
| 4,113,339 A | * | 9/1978 | Eley | H01H 33/045 218/146 |
| 5,059,753 A | * | 10/1991 | Hamm | H01B 17/26 218/84 |
| 5,495,084 A | * | 2/1996 | Meyer | H01H 9/08 218/43 |
| 6,624,370 B1 | * | 9/2003 | Soga | H01H 33/02 218/154 |
| 2008/0235930 A1 | * | 10/2008 | English | B25B 27/062 29/426.5 |
| 2012/0103941 A1 | * | 5/2012 | Nakayama | H02B 13/0354 218/134 |
| 2012/0160810 A1 | * | 6/2012 | Ohtsuka | H02B 13/0354 218/140 |
| 2012/0228267 A1 | * | 9/2012 | Yoshida | H02B 13/0354 218/134 |

* cited by examiner

*Primary Examiner* — Truc Nguyen
(74) *Attorney, Agent, or Firm* — GE Global Patent Operation; Scott R. Stanley

(57) ABSTRACT

An extractor for at least partially extracting a bushing central conductor from a bushing insulator. The extractor comprises a supporting member, a movable member and lifting means. The supporting member is configured to be rigidly secured to the bushing insulator. The movable member is configured to be rigidly secured to the bushing central conductor. The lifting means are configured to move the movable member along the supporting member.

9 Claims, 5 Drawing Sheets

EXTRACTOR OF A BUSHING CONDUCTOR FROM A BUSHING INSULATOR FOR A DEAD TANK CIRCUIT BREAKER

TECHNICAL FIELD

Embodiments of the invention relate to AC or DC voltage circuit breakers for high voltage application, i.e. 72.5 kV or higher.

The circuit breaker comprises a tank housing an interrupter and bushings mounted on the tank. Each of the bushing is provided with current transformers.

The circuit breaker is of the dead tank type in that the tank is at ground potential, so that it is possible to place current transformer on it.

The tank is filled with a pressurized insulating gas, for example sulfur hexafluoride at about 6-7 atmospheres.

The circuit breaker is a three-phase circuit breaker. It contains one pair of bushings for each phase.

The interrupter also contains three puffer type interrupter structures, one for each phase.

Each bushing is configured to be electrically connected to the interrupter via a plug-in connection.

The present invention concerns the removal of an interrupter from a tank of the dead-tank circuit breaker.

BACKGROUND

FIG. 1 illustrates the general constitution of a dead-tank circuit breaker 1. The dead-tank circuit breaker 1 comprises six bushings 2, two of which are to be seen in FIG. 1.

It also comprises a metal tank 3 which houses an interrupter 4 and which is filled with insulating gas. The tank 3 is provided with legs forming a supporting frame 6.

The bushings 2 are connected to the interrupter 4 and they are disconnected from it via plug-in connections 5.

The extraction procedure of the interrupter 4 from the tank 3 requires first the removal of the bushings 2. The insulator shell 14 of the bushing 2 and the central conductor 12 of the bushing 2 are lifted so that the conductor tip 13 disengages the plug-in connection 5.

Once the bushings 2 have been lifted along arrows 70 and 71, the interrupter is removed from the tank along arrow 74.

It is difficult to remove an interrupter 4 from the tank 3 according to this known method.

The bushings 2 are indeed heavy and cumbersome. They need to be safely maintained and removed with a constant angle of tilt from the tank 3.

SUMMARY

Thus, the object of the present invention is to provide a novel method for extracting an interrupter from a tank of a dead-tank circuit breaker and an extractor that would solve at least partly the above-mentioned problems.

The present invention concerns an extractor for at least partially extracting a bushing central conductor from a bushing insulator.

According to the present invention, the extractor comprises:

a supporting member which is configured to be rigidly secured to the bushing insulator, and a movable member which is configured to be rigidly secured to the bushing central conductor, lifting mans configured to move the movable member along the supporting member.

The Extractor allows for safe lifting of the bushing conductor without removal of the hollow insulator shell of the bushing from the tank.

The risks of damages to the bushing are reduced when the interrupter is removed from the tank. Electrical hazards are also reduced, since only a small portion of the bushing conductor could be lifted in comparison to the entire length of the bushing.

The supporting member has a longitudinal axis which is configured to extend parallel to the axis of the bushing insulator; the movable member is movable along the longitudinal axis of the supporting member.

The supporting member at least partially surrounds the movable member.

The lifting means comprise an upper rod which is configured to thread with the movable member for moving the movable member relative to the supporting member.

The lifting means comprise an actuator nut configured to be hand drilled for moving the movable member along the supporting member.

The movable member comprises a movable rod and a conductor support flange which is rigidly secured to the movable rod, and the support flange is configured to be secured to a conductor plate of the bushing central conductor.

The supporting member comprises an upper flange, the extractor comprises at least a peripheral rod extending along the movable member, and the peripheral rod is configured to rigidly secure the upper flange to the bushing insulator.

Each peripheral rod extends through a first through hole of the conductor support flange, and the peripheral rod is configured to extend through a hole in the conductor plate.

The insulator comprises an insulating support for the conductor plate, the peripheral rod is configured to thread into a blind hole inside the insulating support, and the blind hole is used for securing the conductor plate to the insulating support and/or for securing a bushing cap to the insulating support.

The extractor is also configured to insert a bushing central conductor into a bushing insulator, when the supporting member is rigidly secured to the bushing insulator and the movable member is rigidly secured to the bushing central conductor.

Embodiments of the invention also concern an electrical apparatus for middle or high voltage. The electrical apparatus comprises a dead-tank circuit breaker and an extractor as defined above.

The dead-tank circuit breaker comprises a bushing including a central conductor and an insulator around the central conductor, and a tank configured to house an interrupter. The insulator is rigidly secured to the tank.

The extractor is configured to extract the bushing central conductor from the bushing insulator.

Embodiments of the invention also relate to a method for removing an interrupter from a dead-tank circuit breaker of an apparatus as defined above.

The method comprises the extraction of the bushing central conductor from the bushing insulator, the movable member being moved along the supporting member, while the movable member is rigidly secured to an upper extremity bushing central conductor, and while the supporting member is rigidly secured to an upper extremity of the bushing insulator.

The method comprises then the extraction of the interrupter from the tank.

BRIEF DESCRIPTION OF THE DRAWINGS

Embodiments of the invention will be better understood after reading the following description of example embodiments that are in no way limitative, wherein.

Identical, similar or equivalent parts of the different figures are marked with the same numbers for facilitating comparisons between the different figures.

DETAILED DESCRIPTION

Figure 1:
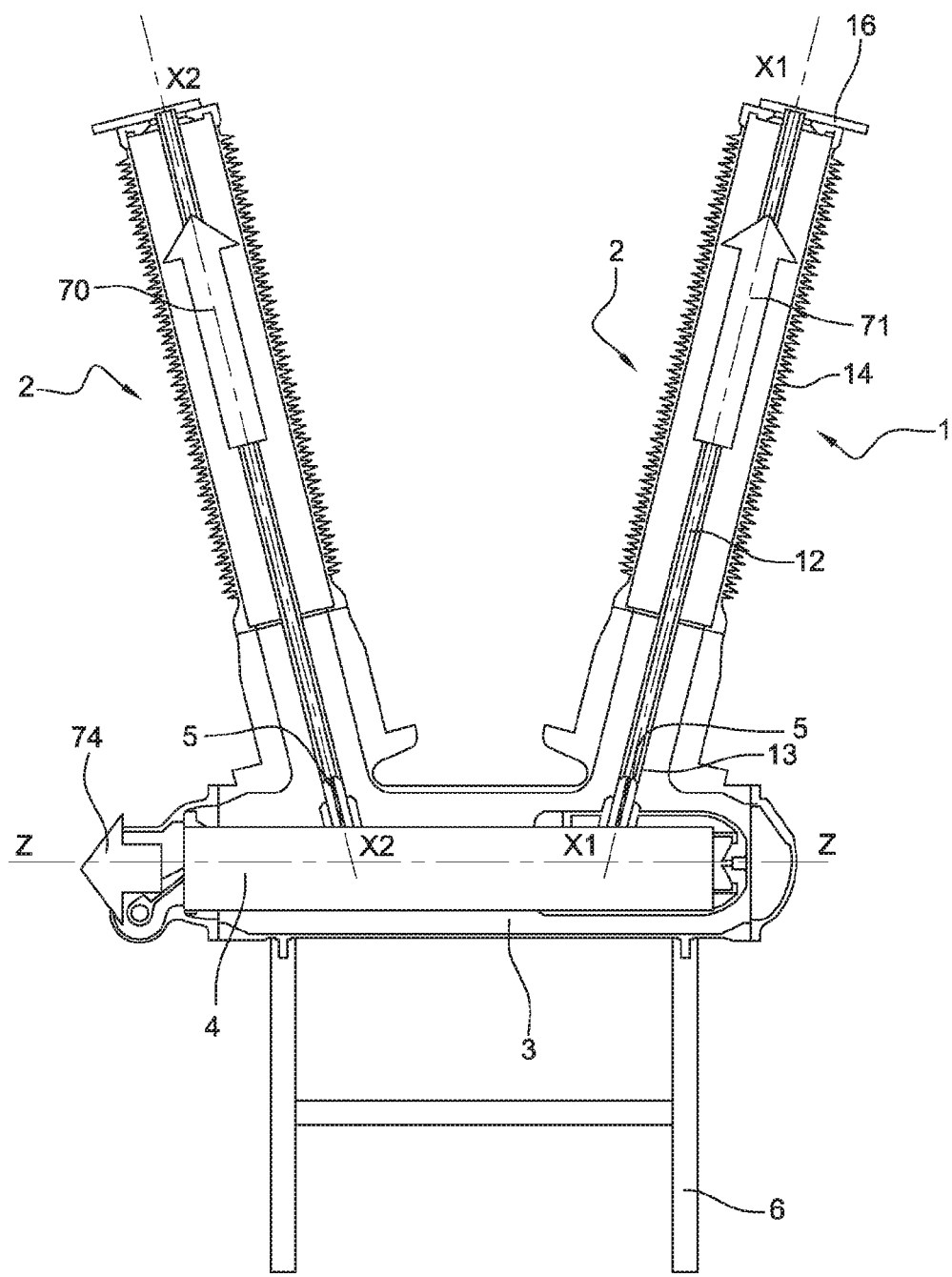
FIG. 1 illustrates removal of an interrupter from a tank of a dead-tank circuit breaker, according to a prior art method.
Figures 2, 3:
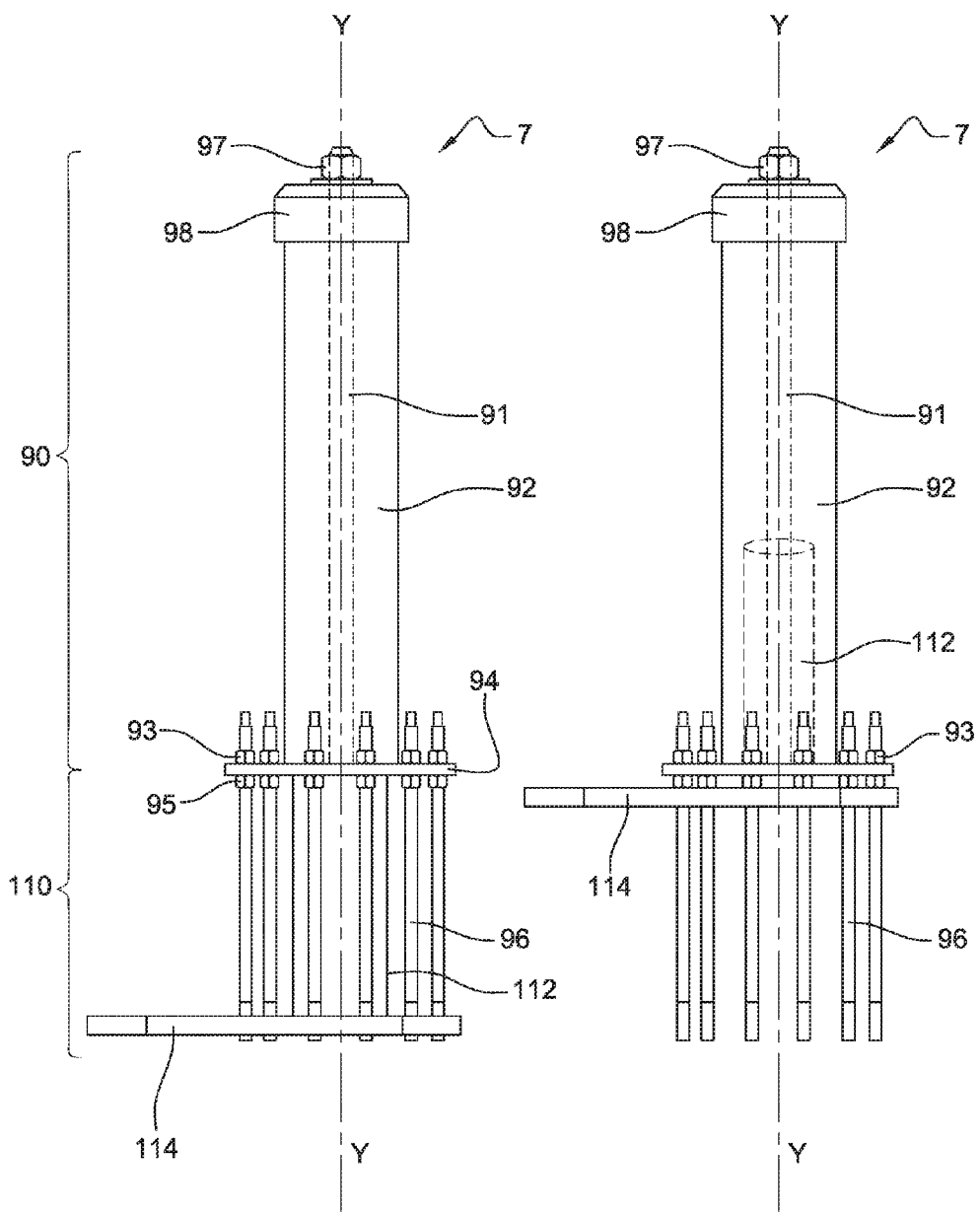
FIG. 2 schematically shows a bushing conductor extractor according to a first embodiment of the invention in an extended position.
FIG. 3 schematically shows the bushing conductor extractor according to the first embodiment in a retracted position.
Figure 7:
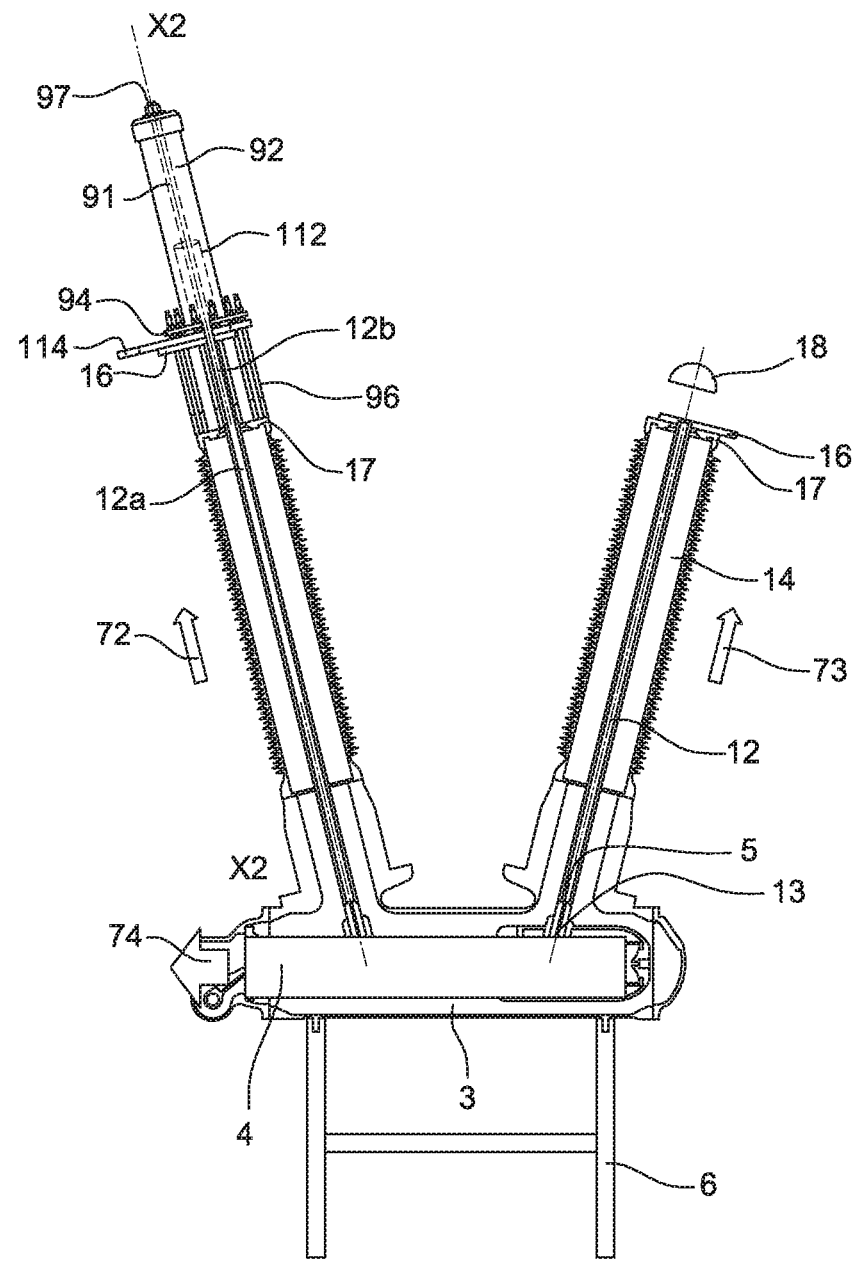
FIG. 7 is a partial longitudinal view of a dead-tank circuit breaker with the extractor according to the first embodiment, in an extended position with a bushing conductor partially removed from the tank.

FIG. 2 and FIG. 7 represent an extractor 7 for at least partially extracting the central conductor 12 of a bushing 2 from the insulator shell 14 of the bushing 2.

The extractor 7 is in its extended position where a conductor support flange 114 is away from an upper flange 94 along the longitudinal axis Y-Y of the extractor 7.

Figure 5:
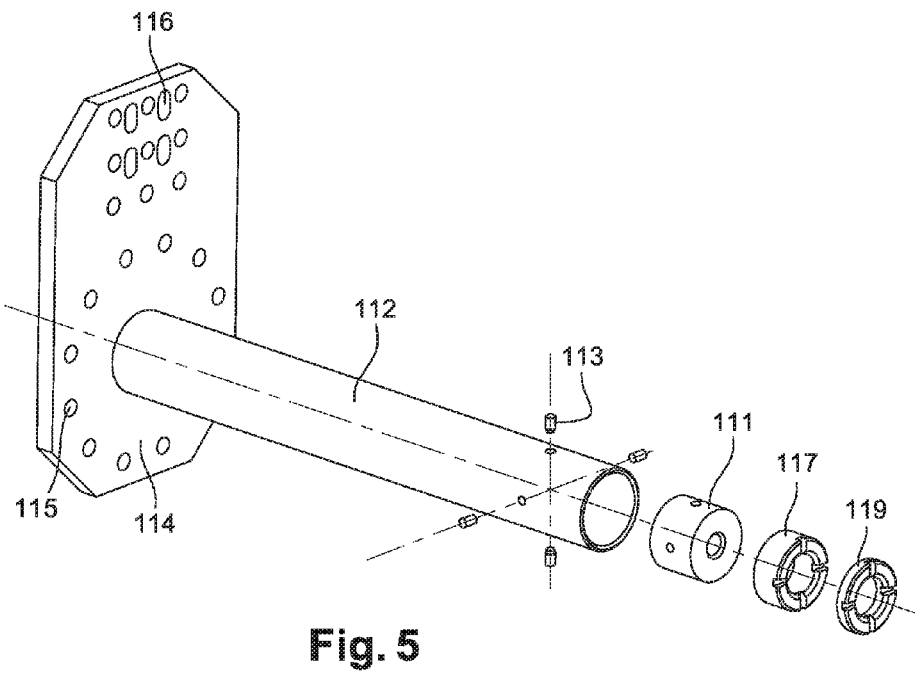
FIG. 5 is an exploded view of the lower portion of the extractor according to the first embodiment.

The extractor 7 is rotary symmetrical around its longitudinal axis Y-Y except for the conductor support flange 114 which has a duckbill portion (FIG. 5).

The longitudinal axis Y-Y of the extractor 7 is configured to be coincident with that $X_2$-$X_2$ of the bushing 2.

The extractor 7 comprises an upper lifting portion 90 which includes the upper flange 94 and a lower lifting portion 110 which includes the conductor support flange 114.

The upper lifting portion 90 comprises an upper retaining cap 98 and an outer tube 92 which is fixed to the cap 18 at its upper extremity and to the upper flange 94 at its lower extremity.

The upper flange 94 is configured to be rigidly secured to a bushing insulator shell 14 by a plurality of peripheral rods 96.

These peripheral rods 96 are threaded to the upper flange 94 near their upper extremity by an upper retaining nut 93 and a lower retaining nut 95. These nuts 93, 95 together sandwich the upper flange 94. They are used for rigidly securing the peripheral rods 96 to the upper flange 94.

The peripheral rods 96 are regularly circumferentially spaced around the upper flange 94 and they are also surrounding the outer tube 92.

Each peripheral rod 96 is also configured to be securely threaded at its lower extremity to a blind hole of an insulating support 17 which is either integrally formed with the insulator shell 14 or fixed to it.

These blind holes are for example used for threading a bushing conductor plate 16 and a bushing cap 18 to the insulator shell 14, when the bushing 2 is under high voltage (FIG. 7).

The peripheral rods 96 extend through the conductor support flange 114 along first through holes 115 of the conductor support flange 114 (FIG. 5) between their upper and their lower extremity.

They are also configured to extend through the bushing conductor plate 16.

Thus, they can guide along them the conductor support flange 114 and the bushing conductor plate 16 which is attached to the conductor support flange 114.

Hence, the upper retaining cap 98, the outer tube 92, the upper flange 94 and the peripheral rods 96 form together a supporting member for the conductor support flange 114.

This supporting member is configured to be rigidly secured to a bushing insulator shell 14.

The lower lifting portion 110 comprises an inner tube 112 and the conductor support flange 114 which is rigidly secured to the lower extremity of the inner tube 112.

The upper extremity of the inner tube 112 is threaded to an upper rod 91 for moving the inner tube 112 along the longitudinal axis Y-Y of the extractor 7.

The outer tube 92 has a greater diameter than the inner tube 112. The inner tube 112 is configured to move inside of the outer tube 92. The inner tube 112 and the outer tube 92 form together a telescopic rod.

The peripheral rods 96 surround the inner tube 112 when the extractor 7 is in its extended position.

The conductor support flange 114 is configured to be threaded to the conductor plate 16 via a plurality of second through holes 116. The conductor support flange 114 is then rigidly secured to the conductor plate 16.

The second through holes 116 are located radially away of the first through holes 115 along the conductor support flange 114 (FIG. 5).

In FIG. 3, the conductor support flange 114 and the inner tube 112 have been lifted relative to the outer tube 92 in comparison to the extended position shown in FIG. 2.

The inner tube 112 and the conductor support flange 114 form together a movable member relative to the supporting member.

This movable member is configured to lift the conductor support plate 16 attached to it along the longitudinal axis Y-Y of the extractor 7.

The extractor 7 also comprises the upper rod 91 and an actuator nut 97.

The upper rod 91 threads with the actuator nut 97 at the upper extremity of the upper rod 91. Both the upper rod 91 and the actuator nut 97 are only movable around the longitudinal axis Y-Y but motionless along this axis.

The upper rod 91 threads with the inner tube 112 via an upper rod engaging nut 111 at the lower extremity of the upper rod 91 (FIG. 5).

The actuator nut 97 is configured to be hand drilled, for example using a screwdriver (not shown), around the longitudinal axis Y-Y of the extractor 7 for lifting the inner tube 112 inside the outer tube 92.

The upper rod 91 and the actuator nut 97 form thus lifting means for lifting the movable member relative to the supporting member.

The extractor 7 is configured to extract the bushing conductor 12 from the plugs-in connection 5, before removing the interrupter 4 from the tank 3.

The extractor 7 is also configured to insert the bushing conductor 12 back into the insulator shell 14 of the bushing 2.

Figure 4:
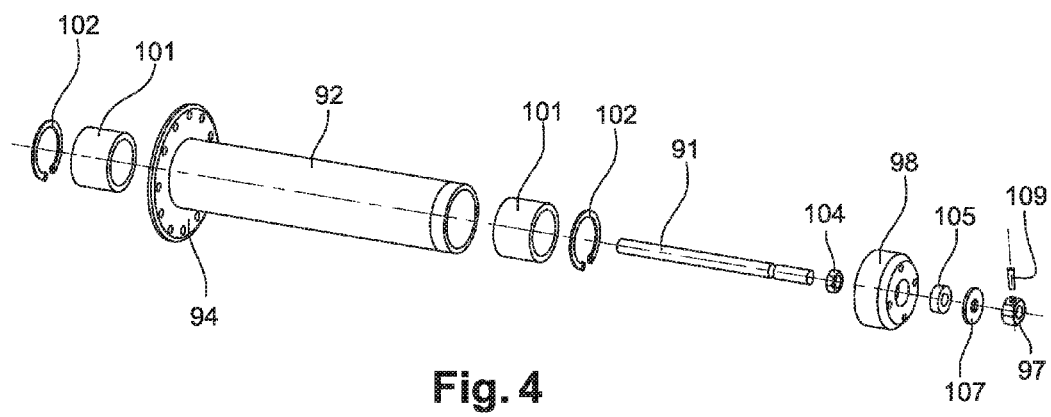
FIG. 4 is an exploded view of the upper portion of the extractor according to the first embodiment.

With reference to FIG. 4, the upper portion 110 comprises two rings 101 which rest on machined counter bores inside the outer tube 92 where it is fixed by two snap rings 102.

A locking collar clamp 104 is installed on the upper rod groove to hold the upper rod 91 unto the underside of the retaining cap 98.

A thrust ball bearing 105 is located above the retaining cap 98 between the retaining cap 98 and the actuator nut 97.

A flat washer 107 is installed between the thrust ball bearing 105 and the actuator nut 97.

The actuator nut 97 is secured to the upper rod 91 by a spring roll pin 109 so that the upper rod 91 and the actuator nut 97 rotate together.

With reference to FIG. 5, the lower lifting portion 110 also comprises the upper rod engaging nut 111.

The screws 113 are configured to provide a positive rotational lock and longitudinal for the upper rod engaging nut 111 relative to the inner tube 112, should any movement or slippage occur between the upper rod retaining nut 111 and the inner tube 112.

The inner retaining nut 117 is configured to thread into the inside of the inner tube 112. This retaining nut 117 securely retains the upper rod engaging nut 111 inside the inner tube 112.

The inner locking nut 119 is configured to thread inside the inner tube 112 in order to lock the inner retaining nut 117 and the upper rod engaging nut 111 relative to the inner tube 112.

Figure 6:
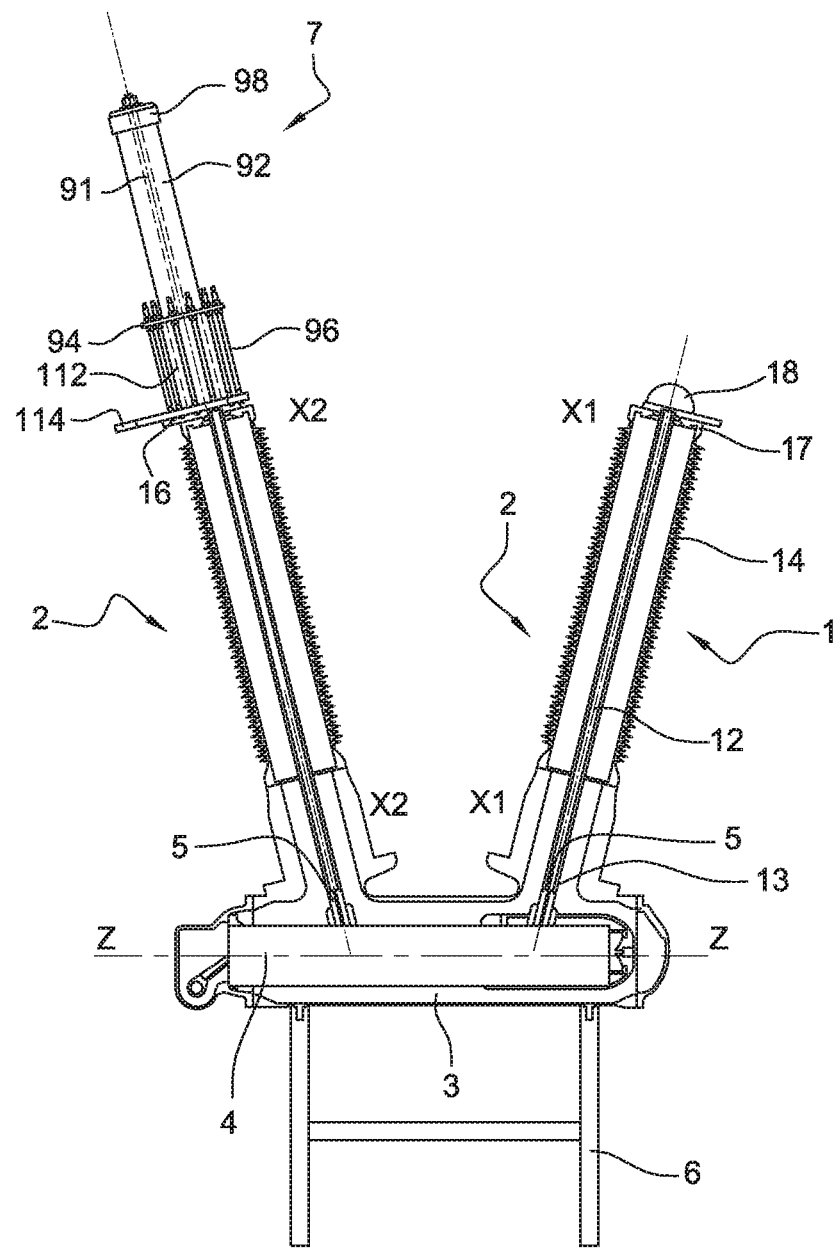
FIG. 6 is a partial longitudinal view of a dead-tank circuit breaker with the extractor according to the first embodiment, in a retracted position and placed on top of a bushing of the circuit breaker.

The removal of a bushing conductor 12 along the longitudinal axis $X_2$-$X_2$ of the bushing 2 is illustrated with reference to FIG. 6 and FIG. 7.

First, the bushing cap 18 is removed from the bushing 2.

Then, the extractor 7 is placed on top of the bushing 2 so that the longitudinal axis Y-Y of the extractor 7 is coincident with the one $X_2$-$X_2$ of the bushing.

The first through holes 115 are aligned with the blind holes of the insulating support 17 of the bushing 2. The peripheral rods 96 extend through the bushing conductor plate 16.

The conductor support flange 114 is rigidly secured to the conductor plate 16 which is on top of the bushing central conductor 12.

The peripheral rods 96 are threaded into the blind holes of the insulating support 17 which is on top of the insulator shell 14. The peripheral rods 96 are then rigidly secured to the insulator shell 14.

The actuator nut 97 is hand drilled around the longitudinal axis $X_2$-$X_2$ of the bushing 2. The upper rod 91 rotates together with the actuator nut 97 and threads with the upper rod engaging nut 111. The movement of the inner tube 112 is guided inside the outer tube 92. The inner tube 112 and the conductor support flange 114 are lifted along the longitudinal axis $X_2$-$X_2$ of the bushing 2. The conductor plate 16 is lifted together with conductor support plate 114 along the longitudinal axis Y-Y of the extractor 7.

Only a small outer portion 12b of the central conductor in comparison to the entire length of the bushing 2 protrudes from the insulator shell 14 along the longitudinal axis $X_2$-$X_2$ of the bushing 2, when the bushing conductor tip 13 has been removed from the plug-in connection 5 inside the tank 3.

A longer inner portion 12a of the central conductor remains inside the hollow insulator shell 14, when the interrupter 4 is ready to be removed from the tank 3.

Once each bushing conductor 12 has been removed from the plug in connection 5 along arrow 72 and 73, the interrupter 4 is removed from the tank 3 along the longitudinal axis Z-Z of the tank 3. The bushing insulator shell 14 has been motionless relative to the tank 3 during the whole process for removing the interrupter 4.

The interrupter 4 or a novel interrupter 4 can be introduced into the tank 3, while all bushing conductor tips 13 are electrically disengaged from the plugs in connections 5. In this case, each bushing conductor plate 16 is lifted by an extractor 7 as described above, while its peripheral rods 96 are rigidly secured to the insulator shell 14 and its contact support flange 114 is rigidly secured to the conductor plate 16.

Once the interrupter 4 is in place inside the tank 3, the inner tube 112 and the conductor support flange 114 are lowered until the end of bushing conductor 12 nears the interrupter plug in connection 5.

The alignment of the bushing conductor 12 and the interrupter plug in connection 5 is visually inspected. If this alignment is not found acceptable, the retaining nuts 93, 95 are selectively adjusted up or down the peripheral rods 96, in order to adjust the end of the bushing conductor 12 in any desired direction.

The inner tube 112 and the conductor support flange 114 are subsequently lowered until the conductor plate 16 rests on the insulating support 17. The peripheral rods 96 are detached from the insulator support 17 and the conductor support flange 114 is detached from the conductor plate 16. The extractor 7 is finally removed from the bushing 2

The conductor plate 16 and the bushing cap 18 are finally secured to the insulator shell 14. The removal of the interrupter 4 is also less time consuming.

The extractor 7 has a limited size. It allows for an easier removal of the interrupter 4 from the tank.

Only a small portion 12b of the central conductor 12 protrudes from the insulator shell 14 when the interrupter 4 is ready to be removed from the tank 3.

The risks of damaging the bushing conductor 12 are reduced, since the bushing conductor 12 is extracted with a constant angle of tilt relative to the longitudinal axis Z-Z of the tank.

The above described embodiment could of course be modified by the man of ordinary skill in the art.

For example, the peripheral rods 96 could also be replaced by a single tube surrounding the inner tube 112.

The conductor support flange 114 and the inner tube 112 could also be manufactured as a single piece.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. An extractor, comprising:
  a supporting member configured to be rigidly secured to a bushing insulator;
  a movable member configured to be rigidly secured to a bushing central conductor, the movable member comprising a movable rod and a conductor support flange secured to the movable rod, the conductor support flange being secured to a conductor plate of the bushing central conductor; and an upper rod configured to thread with the movable member for moving the movable member relative to the supporting member.

2. The extractor according to claim 1, wherein the supporting member has a longitudinal axis (Y-Y) which is configured to extend parallel to an axis ($X_1$-$X_1$, $X_2$-$X_2$) of the bushing insulator, and wherein the movable member is movable along the longitudinal axis (Y-Y) of the supporting member.

3. The extractor according to claim 1, wherein the supporting member at least partially surrounds the movable member.

4. The extractor according to claim 1, further comprising an actuator nut configured to be hand drilled for moving the movable member along the supporting member.

5. The extractor according to claim 1, wherein the supporting member comprises an upper flange, and wherein the supporting member comprises at least a peripheral rod extending along the movable member, wherein each peripheral rod is configured to rigidly secure the upper flange to the bushing insulator.

6. The extractor according to claim 1, wherein each peripheral rod extends through a first through hole of the conductor support flange, wherein each peripheral rod is configured to extend through holes of the conductor plate.

7. The extractor according to claim 1, the insulator comprising an insulating support for the conductor plate, wherein each peripheral rod is configured to thread into a blind hole inside the insulating support, wherein each blind hole is used for securing the conductor plate to the insulating support and/or for securing a bushing cap to the insulating support.

8. An electrical apparatus, comprising:

a dead-tank circuit breaker comprising:

a bushing including a central conductor and an insulator around the central conductor, a tank configured to house an interrupter, wherein the insulator is rigidly secured to the tank, an extractor configured to extract the central conductor from the insulator, the extractor comprising:

a supporting member secured to the insulator, and a movable member secured to the central conductor, the movable member being moveable along the supporting member.

9. A method for extracting the interrupter from a tank of a dead tank circuit breaker of an apparatus according to claim 8, comprising:

at least extracting the central conductor from the insulator, wherein the movable member is moved along the supporting member, while the movable member is rigidly secured to an upper extremity central conductor, and while the supporting member is rigidly secured to an upper extremity of the insulator, extracting the interrupter from the tank.

* * * * *